(12) United States Patent
Niwa et al.

(10) Patent No.: US 9,937,817 B2
(45) Date of Patent: Apr. 10, 2018

(54) VEHICLE HAVING CHARGING TIME ESTIMATION BASED UPON ACTUATION PATTERNS

(71) Applicant: Toyota Jidosha Kabushiki Kaisha, Toyota-shi, Aichi-ken (JP)

(72) Inventors: Yamato Niwa, Toyota (JP); Tomokazu Masuda, Kasugai (JP); Yoshihiro Nomura, Toyota (JP); Kiyohito Machida, Aichi-ken (JP); Yusuke Kuruma, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 15/162,170

(22) Filed: May 23, 2016

(65) Prior Publication Data
US 2016/0347302 A1    Dec. 1, 2016

(30) Foreign Application Priority Data

May 26, 2015    (JP) .................................. 2015-106439

(51) Int. Cl.
*B60L 11/00* (2006.01)
*B60L 11/18* (2006.01)
*B60L 1/00* (2006.01)

(52) U.S. Cl.
CPC ............ *B60L 11/1875* (2013.01); *B60L 1/00* (2013.01); *B60L 11/1814* (2013.01); *B60L 11/1818* (2013.01); *B60L 2240/545* (2013.01); *B60L 2240/80* (2013.01); *Y02T 10/7005* (2013.01); *Y02T 10/705* (2013.01);

(Continued)

(58) Field of Classification Search
None
See application file for complete search history.

(56) References Cited

U.S. PATENT DOCUMENTS

| 2012/0041621 A1* | 2/2012 | Marus | B60L 1/003 701/22 |
| 2013/0134908 A1* | 5/2013 | Sugiyama | B60L 11/14 318/3 |

(Continued)

FOREIGN PATENT DOCUMENTS

| JP | 2014-171345 A | 9/2014 |
| WO | 2012176275 A1 | 12/2012 |

*Primary Examiner* — James M McPherson
(74) *Attorney, Agent, or Firm* — Dinsmore & Shohl LLP

(57) ABSTRACT

A vehicle includes an electrical storage device, an auxiliary load, a charger configured to charge the electrical storage device with power supplied from a power supply outside the vehicle, and an electronic control unit. The electronic control unit is configured to create an actuation schedule of the auxiliary load during charging of the electrical storage device, before initiation of the charging. The electronic control unit is configured to learn charging power of the electrical storage device for each actuation pattern of the auxiliary load during the charging. The electronic control unit is configured to estimate a required time period for the charging based on a learned value of the charging power, an execution time period of each of the actuation patterns, and a total charging power amount of the electrical storage device. The electronic control unit sets initiation time of the charging in accordance with the estimated required time period.

7 Claims, 10 Drawing Sheets

(52) U.S. Cl.
CPC .......... *Y02T 10/7072* (2013.01); *Y02T 90/127* (2013.01); *Y02T 90/14* (2013.01); *Y10S 903/907* (2013.01); *Y10S 903/93* (2013.01)

(56) References Cited

U.S. PATENT DOCUMENTS

| | | | |
|---|---|---|---|
| 2014/0125281 A1 | 5/2014 | Mitsutani | |
| 2014/0200763 A1* | 7/2014 | Sisk | B60W 10/24 701/36 |
| 2014/0277869 A1* | 9/2014 | King | B60H 1/00278 701/22 |
| 2016/0046199 A1* | 2/2016 | Butler | B60L 11/1846 320/106 |
| 2016/0107635 A1* | 4/2016 | Kodawara | B60K 6/48 701/22 |
| 2016/0137149 A1* | 5/2016 | Kamachi | H02J 7/02 307/10.1 |
| 2016/0243947 A1* | 8/2016 | Perkins | B60L 1/003 |
| 2016/0243958 A1* | 8/2016 | Miller | B60L 11/1816 |
| 2016/0244044 A1* | 8/2016 | Miller | B60W 20/106 |
| 2016/0248107 A1* | 8/2016 | Matsumoto | H01M 8/04888 |
| 2016/0303992 A1* | 10/2016 | Lovett | B60L 11/1868 |
| 2016/0352120 A1* | 12/2016 | Lovett | H02J 7/0047 |
| 2016/0362013 A1* | 12/2016 | Gibeau | B60L 11/1844 |

\* cited by examiner

VEHICLE HAVING CHARGING TIME ESTIMATION BASED UPON ACTUATION PATTERNS

CROSS-REFERENCE TO RELATED APPLICATIONS

The present disclosure claims priority to Japanese Patent Application No. 2015-106439 filed on May 26, 2015, which is incorporated herein by reference in its entirety including the specification, drawings and abstract.

BACKGROUND

1. Technical Field

The present disclosure relates to a vehicle and, further specifically, relates to a vehicle that has a configuration of charging an on-board electrical storage device with power from outside of the vehicle.

2. Description of Related Art

A technique for charging an on-board electrical storage device of an electric vehicle, a hybrid vehicle, or the like by a power supply from the outside of the vehicle (hereinafter, also simply referred to as an "external power supply") has been known. Note that, hereinafter, charging of the on-board electrical storage device by the external power supply will also simply be referred to as "external charging".

As one aspect of the external charging, so-called timer charging is described in International Publication No. 2012/176275, Japanese Patent Application Publication No. 2014-171345 (JP 2014-171345 A), and the like, and, in the timer charging, a time schedule of the external charging is controlled such that the on-board electrical storage device becomes a fully charged state at scheduled charging finish time that is set in advance.

It is described in International Publication No. 2012/176275 that, in the timer charging, learning control of parameters that are related to a factor influencing estimation of a charging time period of the electrical storage device is executed and charging initiation time is set based on the charging time period that is estimated by using learned values by said learning control.

In the timer charging in JP 2014-171345 A, suppliable power to a charging stand in a facility where the charging stand is installed is computed by reflecting a predicted value of a power demand of a load device in the facility. Furthermore, it is described that external charging completion time is computed based on said suppliable power and a remaining amount in the electrical storage device.

In the vehicle, a situation where a consumed amount of the power by an auxiliary machine becomes relatively large during the external charging due to actuation of a heater for warming the electrical storage device or timer actuation of an air conditioner by a user (hereinafter, also referred to as timer air conditioning) possibly occurs. In this case, charged power in the electrical storage device is reduced by the consumed amount of the power by the auxiliary machine. Thus, a time period required for charging is extended.

However, in International Publication No. 2012/176275, while a parameter CAP that reflects a reduction in a charging capacity of the electrical storage device, a parameter EFC that reflects a change in charging efficiency, a parameter CHGT that reflects an estimation error of the charging time period, a parameter PTB for temperature estimation of the electrical storage device, and the like are exemplified as the parameters that are targets of the learning control, a fact that the required charging time period is changed in accordance with the actuation of the auxiliary machine is not conceived at all. Accordingly, in the timer charging disclosed in International Publication No. 2012/176275, a change in the charged power that corresponds to an actuating situation of the auxiliary machine is absorbed by the learned values of the parameters. Thus, when the actuating situation of the auxiliary machine is changed, an error possibly occurs to the estimation of the charging time period by using the same learned values.

Similarly, in JP 2014-171345 A, while a fluctuation in the suppliable power from the charging stand to the vehicle is estimated, a fact that the charged power in the electrical storage device is changed with respect to the suppliable power to the vehicle is not conceived.

Thus, according to the timer charging described in International Publication No. 2012/176275 and JP 2014-171345 A, the estimation error possibly occurs to the required charging time period of the electrical storage device in accordance with the actuating situation of the auxiliary machine. Thus, in the case where an actually required charging time period is longer than the estimation, charging of the electrical storage device is not completed when the scheduled charging finish time arrives. In this case, degraded convenience for the user is concerned. Alternatively, in the case where the actually required charging time period is much shorter than the estimation, deterioration of the electrical storage device that is caused by leaving the electrical storage device in the fully charged state for a long time period is concerned.

SUMMARY

The present specification discloses a vehicle in which a required charging time period is accurately estimated during external charging of the vehicle by timer charging.

In one aspect of the present disclosure, a vehicle includes an electrical storage device, an auxiliary load actuated in conjunction with power consumption, a charger, and an electronic control unit. The charger is configured to charge the electrical storage device with power supplied from a power supply outside the vehicle. The electronic control unit is configured to control a time schedule of external charging of the electrical storage device using the charger. The electronic control unit is configured to create an actuation schedule prior to initiation of the charging, the actuation schedule designating time at which the auxiliary load is actuated during the external charging. The electronic control unit is configured to stratify an actuation pattern of the auxiliary load and learn charging power of the electrical storage device for each of the actuation patterns during the external charging. The electronic control unit is configured to estimate a required time period for the external charging based on a learned value of the charging power for each of the actuation patterns, an execution time period of each of the actuation patterns in accordance with the actuation schedule, and a total charging power amount obtained from a state of charge of the electrical storage device prior to the initiation of the charging. In addition, the electronic control unit is configured to set initiation time of the external charging in accordance with the estimated required time period.

According to the above vehicle, a result value of the charging power during the external charging can be learned for each of the actuation patterns of the auxiliary load. Accordingly, even when the charging power of the electrical storage device is changed in accordance with an actuating situation of the auxiliary load, the required charging time period can accurately be estimated by using the learned value of the charging power. Thus, the charging initiation time can appropriately be set such that the electrical storage device becomes a fully charged state at set charging finish time during the external charging by timer charging. As a result, a case where the charging of the electrical storage device is uncompleted at drive initiation time of the vehicle or a case where the electrical storage device is left in the fully charged state for a long time period does not occur. Therefore, improvement in convenience of a user and deterioration prevention of the electrical storage device can be realized.

According to this vehicle, the required charging time period can accurately be estimated during external charging by the timer charging.

The auxiliary load may include a heater configured to raise a temperature of the electrical storage device when being actuated. The electronic control unit may be configured to create the actuation schedule such that the heater is actuated during the external charging. The actuation patterns may be separated from each other in accordance with stop and actuation of the heater.

With such a configuration, even when the heater is actuated at predetermined time during the external charging, the required charging time period can accurately be estimated by using the charging power learned value.

Alternatively, the auxiliary load may include: an air conditioner configured to adjust a temperature inside a vehicle cabin; and a heater configured to raise a temperature of the electrical storage device when being actuated. The electronic control unit may be configured to create the actuation schedule such that the air conditioner and the heater are actuated during the external charging. The actuation patterns may be separated from each other in accordance with presence or absence of actuation of the heater and presence or absence of actuation of the air conditioner.

With such a configuration, even when the heater or the air conditioner is actuated at predetermined time during the external charging, the required charging time period can accurately be estimated by using the charging power learned value.

In addition, the vehicle may further include first and second power converters. The first power converter may be configured to convert power from the charger into drive power of the auxiliary load. The second power converter may be configured to convert power from the electrical storage device into the drive power of the auxiliary load. It may be configured that a power capacity of the second power converter is larger than a power capacity of the first power converter. The electronic control unit may be configured to actuate at least one of the first and second power converters in accordance with an actuating situation of the auxiliary load during the external charging. The actuation patterns may be separated from each other during actuation of the first power converter and during actuation of the second power converter.

With such a configuration, the actuation pattern can be stratified in accordance with a level of consumed power by the auxiliary load based on actuation states (on/off) of the first and second power converters, and thus the result value of the charging power can be learned. As a result, learning accuracy of the charging power and estimation accuracy of the required charging time period can be increased.

Alternatively, the electronic control unit may be configured to learn the charging power learned value in each of the actuation patterns separately for each condition of a power supply outside the vehicle.

With such a configuration, the charging power learned value can be obtained by distinguishing differences in charging efficiency of the electrical storage device, which are caused by differences in the charging power due to inherent differences between charging facilities. As a result, the estimation accuracy of the required charging time period can further be increased by increasing learning accuracy of the charging power.

Alternatively, the electronic control unit may be configured to learn the charging power learned value in each of the actuation patterns separately for each weather condition during the external charging.

With such a configuration, the charging power learned value can be obtained by distinguishing differences in the charging efficiency of the electrical storage device, which are caused by differences in a temperature condition. As a result, the estimation accuracy of the required charging time period can further be increased by increasing learning accuracy of the charging power.

In addition, the electronic control unit may be configured to stop learning of the charging power during actuation of a particular load among plural loads included by the auxiliary load.

For example, the particular load may include a load, consumed power of which is large, or a load, consumed power of which tends not to be constant. With such a configuration, it is possible to prevent a fluctuation in the learned value of the charging power that is expected at a time when the consumed power by the auxiliary load is large or at a time when the consumed power by the auxiliary load fluctuates. As a result, the estimation accuracy of the required charging time period can further be increased by increasing the learning accuracy of the charging power.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Figure 1:
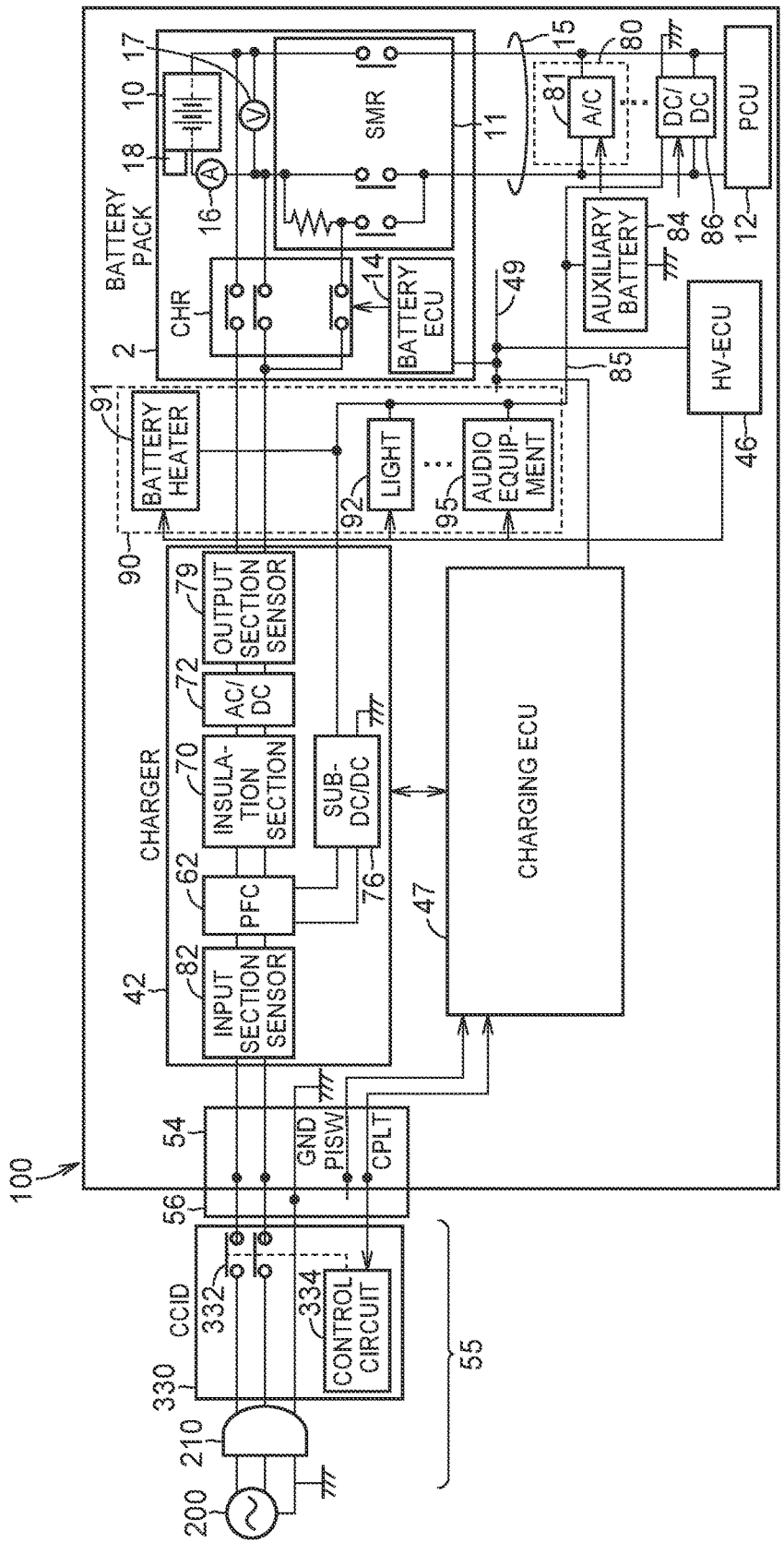
FIG. 1 is an overall block diagram of a hybrid vehicle that is shown as one example of a vehicle in an embodiment of the present disclosure.

A detailed description will hereinafter be made on an embodiment of the present disclosure with reference to the drawings. Note that the same or corresponding portions in the drawings are denoted by the same reference numerals and the description thereon will not be repeated in principle.

FIG. 1 is an overall block diagram of a hybrid vehicle that is shown as one example of a vehicle in the embodiment of the present disclosure.

Note that the "hybrid vehicle" will hereinafter simply be referred to as a "vehicle". The present disclosure is not limited to the hybrid vehicle but can also be applied to an electrically powered vehicle such as an electric vehicle in which an on-board electrical storage device can be charged by a power supply outside the vehicle.

With reference to FIG. 1, a vehicle 100 includes a battery pack 2, a power control unit (PCU) 12, and an HV-ECU (electronic control unit) 46.

The battery pack 2 includes an electrical storage device 10, a system main relay (SMR) 11, a current sensor 16, a voltage sensor 17, a temperature sensor 18, a charging relay CHR, and a battery ECU 14.

The electrical storage device 10 is a rechargeable DC power supply. Hereinafter, a secondary battery such as a nickel-metal hydride battery or a lithium-ion battery will be applied as the electrical storage device 10. Note that a point that an electrical storage element other than the secondary battery, such as an electric double-layered capacitor, can also be applied as the electrical storage device 10 is described for a purpose of confirmation. Hereinafter, the electrical storage device 10 will also simply be referred to as a battery 10.

Although not shown, each of the ECUs is configured by including a central processing unit (CPU), a memory, and input/output buffers. In this embodiment, a control function of each of the ECUs, which will be described below, can be realized by software processing in which the CPU executes a specified program, for example. Alternatively, said function can also be realized by hardware processing when a dedicated electronic circuit is provided in each of the ECUs.

The battery ECU 14 controls opening/closing of the charging relay CHR and can also compute a state of charge (SOC) of the electrical storage device 10 from output of the current sensor 16, the voltage sensor 17, and the temperature sensor 18. As it has been known, the SOC represents a remaining capacity of the electrical storage device 10 with respect to a fully charged capacity thereof that is expressed in percentage.

A power line 15 is connected to the battery 10 through the SMR 11. The PCU 12 is connected to the power line 15. The PCU 12 is configured by including an inverter and the like, and the inverter drives a motor that is not shown and that drives the vehicle. Accordingly, when the SMR 11 is on, the vehicle 100 can travel by converting power from the battery 10 into drive power of the above motor in the PCU 12.

The HV-ECU 46 inputs a signal from each of the sensors and the like, outputs a control signal to each equipment, and controls various types of the equipment for traveling of the vehicle 100.

The vehicle 100 further includes a charger 42, a charging ECU 47, and a charging inlet 54 as a configuration for external charging.

The charging inlet 54 is configured to be connectable to a connector 56 of a charging cable 55. The charging cable 55 is constructed of: a plug 210 that is connected to a vehicle exterior power supply; a CCID box 330 that includes a relay 332 and a control circuit 334; and the connector 56.

An input terminal of the charger 42 is connected to the charging inlet 54. An output terminal of the charger 42 is connected to the battery 10 through the charging relay CHR.

When the charging connector 56 is connected to the charging inlet 54, an operation mode is set to a charging mode. That is, in the charging mode, an external power supply 200 is electrically connected to the charging inlet 54.

In the charging mode, the charger 42 receives power that is supplied from the external power supply 200 through the plug 210, the CCID box 330, and the connector 56. Then, when being actuated in correspondence with a charging command from the charging ECU 47, the charger 42 converts the power from the external power supply 200 into charging power of the battery 10. For example, when being actuated, the charger 42 converts an AC voltage (100 VAC or 200 VAC) from the external power supply 200 into a DC voltage (for example, 200 VDC).

More specifically, the charger 42 includes an input section sensor 82, a power factor correction (PFC) 62, an insulation section 70, an AC/DC conversion section 72, an output section sensor 79, a sub-DC/DC converter 76, and the charging ECU 47.

When the charger 42 is actuated, the input section sensor 82 detects the voltage that is input from the external power supply 200 to the charger 42. The PFC 62 converts the AC voltage from the external power supply 200 into the DC voltage, and then further converts the DC voltage into the AC voltage at a higher frequency. In this power conversion, the PFC 62 improves a power factor by controlling a waveform of an input current from the external power supply 200 to be a sine wave in the same phase as a waveform of the input voltage.

The insulation section 70 is constructed of an insulation transformer and the like and boosts the AC voltage from the PFC 62. The AC/DC conversion section 72 converts AC power from the insulation section 70 into DC power. The AC/DC conversion section 72 may be constructed of a rectifier element such as a diode bridge or may be constructed of a circuit that can execute voltage/current control of a full-bridge circuit of a transistor and the like. By controlling amplitude of the AC voltage from the PFC 62 or, in addition to this, by the voltage/current control in the AC/DC conversion section 72, the DC voltage from the AC/DC conversion section 72 is controlled to be a voltage that is suitable for charging of the battery 10. The output section sensor 79 detects an output voltage VH of the AC/DC conversion section 72.

As shown in FIG. 1, for example, when the connector 56 of the charging cable 55 is connected to the charging inlet 54 of the vehicle 100, the charging ECU 47 communicates with the control circuit 334 of the CCID box 330 of the charging cable 55 to transmit a control pilot signal CPLT. Once the connection is detected, the charging ECU 47 uses the control pilot signal CPLT and requests the CCID box 330 to close the relay 332 therein and supply the power.

For example, as one example of a standard of a plug-in vehicle, a standard of a control pilot signal (a CPLT signal) is defined for an "SAE electric vehicle conductive charge coupler". The CPLT signal has a function of notifying a state where the power can be supplied and a function of instructing initiation of the charging between the charging cable and the vehicle when a square wave signal is transmitted from an oscillator to a control pilot line. In addition, a PISW signal that is input from the connector 56 to the charging ECU 47 is a signal indicative of a state where the charging cable 55 is connected or disconnected.

Next, a description will be made on power supply to auxiliary loads of the vehicle 100. The vehicle 100 further includes: an auxiliary load 80 of a high-voltage system that is connected to the power line 15; and an auxiliary load 90 of a low-voltage system that is connected to a power supply wire 85. The power supply wire 85 is connected to an auxiliary battery 84 and supplies a power supply voltage (for example, 12V) of the auxiliary load 90 of the low-voltage system.

The auxiliary load 80 of the high-voltage system has an air conditioner (A/C) 81 for adjusting a temperature inside a vehicle cabin by warming or cooling, for example. The air conditioner 81 is actuated in correspondence with a user operation of an operation switch in the vehicle cabin. Note that the air conditioner 81 can also be actuated by a remote control operation or the like even when an occupant is not in the vehicle cabin. Alternatively, the air conditioner 81 executes timer air conditioning when being actuated by following an actuation command from the HV-ECU 46. For example, the timer air conditioning is executed in accordance with a time schedule during which the air conditioner 81 is actuated for a specified time period prior to initiation of driving in accordance with drive initiation time of the vehicle 100.

The auxiliary load 90 of the low-voltage system has a battery heater 91, a light 92, and audio equipment 95, for example. In addition to the above examples, the auxiliary loads 80 and 90 include various types of electrical equipment. The battery heater 91 corresponds to one example of the "heater", and is configured to generate heat during actuation and raise a temperature of the battery 10. Thus, the battery heater 91 is disposed near the battery 10. Note that the battery heater 91 can also be disposed in the battery pack 2. The light 92 collectively represents a headlight, a vehicle cabin light, and the like. The audio equipment 95 has a sound volume adjusting function.

A DC/DC converter 86 is connected between the power line 15 and the power supply wire 85. When the SMR 11 is on, the DC/DC converter 86 is actuated, lowers an output voltage of the battery 10 on the power line 15, and outputs an auxiliary voltage of the low-voltage system to the power supply wire 85.

The sub-DC/DC converter 76 in the charger 42 is connected to a power conversion route by the charger 42. For example, the sub-DC/DC converter 76 lowers the DC voltage in the PFC 62 and outputs the auxiliary voltage of the low-voltage system to the power supply wire 85. The SMR 11 is usually turned off in the charging mode. Thus, the auxiliary voltage of the low-voltage system is generated by the sub-DC/DC converter 76.

It is designed such that a power capacity (output power rating) of the DC/DC converter 86 is larger than a capacity of the sub-DC/DC converter 76. Accordingly, the sub-DC/DC converter 76 corresponds to one example of the "first power converter", and the DC/DC converter 86 corresponds to one example of the "second power converter". Note that the "first power converter" may be constructed of an AC/DC converter that is connected to a node for outputting an AC voltage in the charger 42.

In addition, in the vehicle 100 of this embodiment, a component that integrates the functions of the charging ECU 47, the HV-ECU 46, and the battery ECU 14 is one example of the "electronic control unit". These ECUs may integrally be configured or may be disposed separately for each of the functions as in FIG. 1. Note that a signal or data can be received/transmitted among the separately disposed ECUs through a local bus 49.

Figure 2:
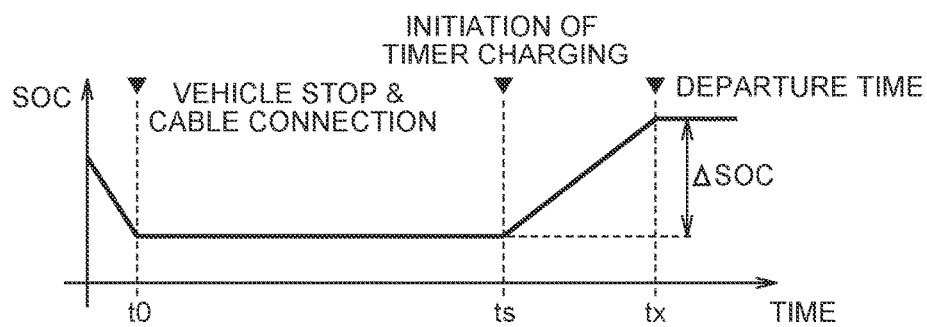
FIG. 2 is a schematic waveform chart that explains an operation example of external charging by timer charging in the vehicle according to this embodiment.

FIG. 2 is a schematic waveform chart that explains an operation of the external charging by timer charging in the vehicle according to this embodiment.

With reference to FIG. 2, after the vehicle 100 is stopped at a place where a charging facility is provided, the connector 56 of the charging cable 55 is connected to the charging inlet 54 at time t0. In this way, a state where the external charging can be initiated is generated, and the charging mode is initiated.

In the case where the timer charging is set, even after the charging mode is initiated, the external charging is suspended until charging initiation time ts is that is determined in accordance with a time schedule of the external charging (hereinafter, also referred to as a "charging schedule") arrives.

The charging schedule is set such that the battery 10 becomes a fully charged state at predetermined charging finish time tx. Hereinafter, an increased amount of the SOC of the battery 10 by the external charging is expressed as ΔSOC.

Corresponding to departure time of the vehicle 100 (that is, next vehicle drive initiation time), the charging finish time tx is set to time immediately before the departure time, in some embodiments. It is because progress of deterioration of the battery 10 is concerned when the battery 10 is left in the fully charged state for a long time period.

A required time period for the external charging is estimated, and then the charging initiation time ts is set by bringing time back from the charging finish time tx. Accordingly, if estimation accuracy of the required charging time period is low, the charging of the battery 10 may not be completed by the charging finish time tx, or the battery 10 may be deteriorated due to early completion of the charging. Thus, it is important to accurately estimate the required charging time period when the charging schedule is created.

Figure 3:
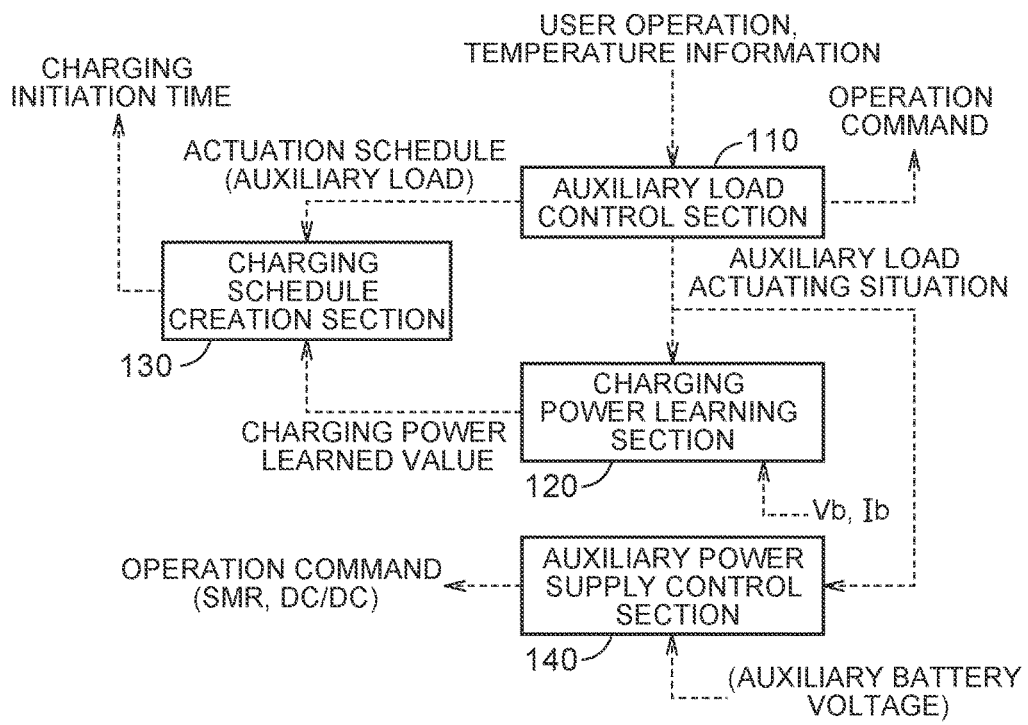
FIG. 3 is a functional block diagram that shows a control configuration related to the timer charging in the vehicle according to the embodiment of the present disclosure.

FIG. 3 is a functional block diagram that shows a control configuration related to the timer charging in the vehicle according to the embodiment of the present disclosure. Control related to the timer charging is executed by each of the ECUs.

With reference to FIG. 3, an auxiliary load control section 110 controls operations of the auxiliary loads 80, 90 during the external charging. For example, in correspondence with a user input to an operation switch (not shown) in the vehicle 100, the auxiliary load control section 110 can issue an operation command to corresponding load equipment.

Furthermore, the auxiliary load control section 110 can automatically control actuation periods of the auxiliary loads 80, 90 on a time basis during the external charging. For example, in a winter season, the battery heater 91 is automatically actuated during the external charging for battery preheating that raises the temperature of the battery 10 prior to traveling of the vehicle. Alternatively, the air conditioner 81 is actuated during the external charging for the timer air conditioning that cools or warms the inside of the vehicle cabin prior to traveling of the vehicle.

For the automatic control of the auxiliary loads 80, 90, just as described, an "actuation schedule" is created by the auxiliary load control section 110 prior to the initiation of the charging. In the "actuation schedule", the auxiliary load as an actuation target is specified, and the actuation period of said auxiliary load is specified on the time basis. Furthermore, the operation command is generated by following the created actuation schedule when time, at which the auxiliary load is set to be actuated, arrives.

For example, for the battery preheating, the actuation period of the battery heater 91 is set such that the temperature of the battery 10 is raised to a specified temperature at the next vehicle drive initiation time set in advance. For example, a map is created in advance in which a required time period for the above temperature rising is set based on the battery temperature at the initiation of the charging mode. In this way, the actuation schedule of the battery heater 91 can be created by computing backward from the vehicle drive initiation time.

In addition, for the timer air conditioning, the actuation period of the air conditioner 81 is provided for a period that is directly set by the user or a specified period that is set back from the set drive initiation time. Usually, the user inputs on/off of the timer air conditioning and a set temperature of the air conditioner.

Just as described, the actuation schedules of the auxiliary loads during the external charging are set by the auxiliary load control section 110. Said actuation schedules are sent to a charging schedule creation section 130. Accordingly, by referring to the actuation schedules of the auxiliary loads, the charging schedule creation section 130 can comprehend in advance which auxiliary load is actuated for which period (on the time basis).

The charging power learning section 120 computes the charging power of the battery 10 during the external charging based on information from the battery ECU 14 (a voltage Vb and a current Ib of the battery 10), and learns a result value of the charging power for each of predetermined actuation patterns of the auxiliary loads. The charging power learning section 120 sequentially receives information indicative of an actuating situation of each of the auxiliary loads 80, 90 from the auxiliary load control section 110 and thus can comprehend under which actuation pattern the current charging power is.

The charging schedule creation section 130 can estimate the required charging time period by dividing a total charging capacity in the external charging by the charging power (kW) during the external charging. Note that the total charging capacity (kWh) can be computed from the full charging capacity of the battery 10 and ΔSOC (FIG. 2) that is obtained by subtracting the SOC prior to the external charging from the SOC at full charging.

Furthermore, in accordance with the actuation schedule of the auxiliary load from the auxiliary load control section 110, the charging schedule creation section 130 can predict an operation period of the auxiliary load in each of the actuation patterns during the external charging. Accordingly, in the timer charging by the vehicle according to this embodiment, the required charging time period is estimated based on a charging power learned value in each of the actuation patterns, the actuation schedule of the auxiliary load, and the total charging capacity.

At the initiation of the charging mode, the charging schedule creation section 130 determines whether to execute the timer charging based on an instruction input by the user or the like. Then, when executing the timer charging, the charging schedule creation section 130 creates the charging schedule of the external charging. More specifically, the charging schedule creation section 130 sets charging finish time (tx in FIG. 2) that corresponds to the next vehicle drive initiation time in accordance with a direct input of time by the user, based on past drive history (per day of a week or for each of weekday/holiday), or the like. Furthermore, based on the above-described estimation of the required charging time period, the charging schedule creation section 130 sets charging initiation time (ts in FIG. 2) by computing backward from the charging finish time.

Note that, when the timer charging is unnecessary, the charging schedule creation section 130 initiates charging of the battery 10 immediately after the initiation of the charging mode that is realized by the connection of the charging cable 55.

An auxiliary power supply control section 140 controls generation of the auxiliary voltage of the low-voltage system during the external charging, that is, actuation states (on/off) of each of the sub-DC/DC converter 76 and the DC/DC converter 86. In the charging mode, basically, the SMR 11 is turned off, and the auxiliary voltage of the low-voltage system is generated by the sub-DC/DC converter 76. Accordingly, while the sub-DC/DC converter 76 is actuated at the initiation of the charging mode, the DC/DC converter 86 is stopped.

When consumed power by the auxiliary load 90 is increased in this state, the auxiliary power supply control section 140 instructs turning on of the SMR 11 and actuation of the DC/DC converter 86. Because a capacity of the DC/DC converter 86 is larger than that of the sub-DC/DC converter 76, auxiliary voltage supply capability to the low-voltage system is improved. In this case, the sub-DC/DC converter 76 may be either stopped or actuated.

The consumed power by the auxiliary load 90 can be detected indirectly from an output voltage of the auxiliary battery 84 that is detected by an unillustrated voltage sensor or from the actuating situation of the auxiliary load 90 that is comprehended by the auxiliary load control section 110. Alternatively, actual consumed power can also be monitored by disposing a current sensor in the power supply wire 85.

A level of the consumed power by the auxiliary load 90 can also be detected from the actuation states of the sub-DC/DC converter 76 and the DC/DC converter 86 that are controlled by the auxiliary power supply control section 140, just as described.

Each function of the auxiliary load control section 110, the charging power learning section 120, the charging schedule creation section 130, and the auxiliary power supply control section 140 can be realized by the software processing and/or the hardware processing by each of the ECUs.

In accordance with the above-described actuation schedule of the auxiliary load, there is a case where the actuation period of the auxiliary load occurs during at least part of the external charging between the time is and the time tx in FIG. 2. As it is understood from FIG. 1, the power for actuating the auxiliary loads 80, 90 is taken out by the sub-DC/DC converter 76 and/or the DC/DC converter 86 from a charging route that runs from the charging inlet 54 to the battery 10 through the charger 42. Accordingly, the charging power of the battery 10 is reduced along with the consumed power by the auxiliary load in the actuation period of the auxiliary load. That is, it is understood that the actual charging power of the battery 10 is not determined only by specifications of the external power supply 200, the charging cable 55, and the charger 42 but is changed in accordance with the actuating situations of the auxiliary loads 80, 90.

Figures 4, 5:
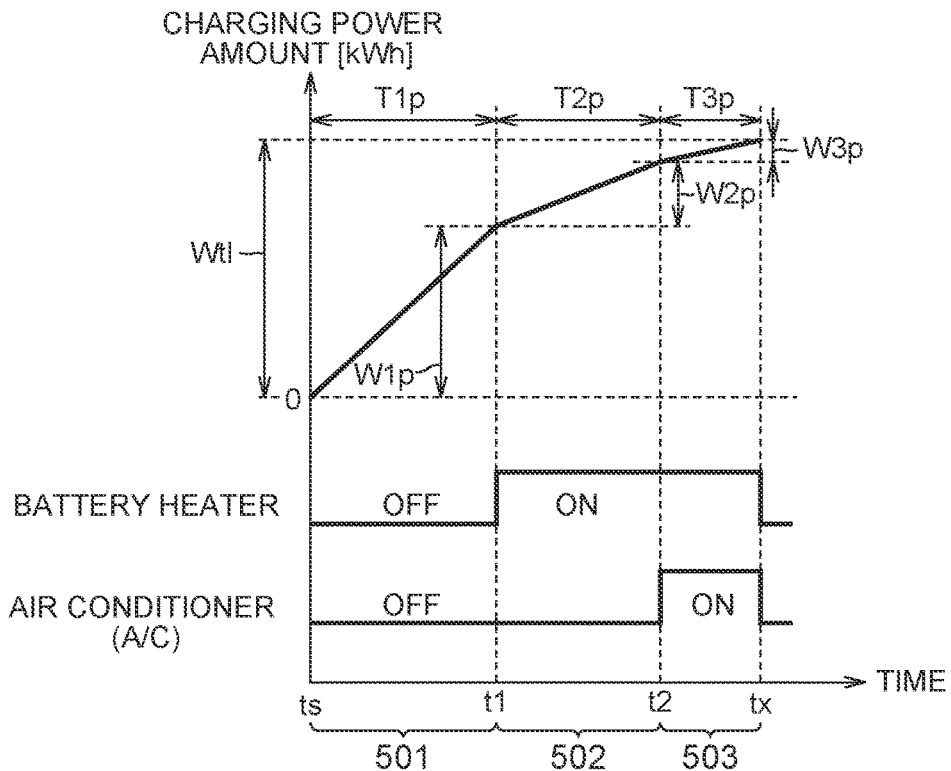
FIG. 4 is a schematic waveform chart that shows one example of the external charging under a condition that actuation patterns of auxiliary loads are changed.
FIG. 5 is a table that explains learning of charging power for each of the actuation patterns of the auxiliary loads during timer charging in the vehicle according to this embodiment.

FIG. 4 is a schematic waveform chart that shows one example of the external charging under a condition that the actuation patterns of the auxiliary loads are changed. A horizontal axis of FIG. 4 represents a time axis, and a vertical axis indicates a charging power amount (kWh) to the battery 10.

With reference to FIG. 4, the charging schedule is created such that the battery 10 is fully charged at the charging finish time tx. Furthermore, separately from the charging schedule, the actuation schedules of the auxiliary loads are created by the auxiliary load control section 110.

In examples of the actuation schedule that are exemplified in FIG. 4, in preparation for the initiation of the vehicle drive immediately after the charging finish time tx, the battery preheating for actuating the battery heater 91 and the timer air conditioning for adjusting the temperature inside the vehicle cabin to a suitable temperature are executed. Accordingly, the battery heater 91 is actuated from time t1 to tx, and the air conditioner 81 is actuated from time t2 to tx.

As a result, in an external charging period from the charging initiation time ts to the charging finish time tx, the battery 10 is charged under a condition that the battery heater 91 and the air conditioner 81 do not consume the power in a period 501 from ts to t1 (period length T$1p$). Meanwhile, the battery 10 is charged under a condition that the battery heater 91 consumes the power in a period 502 from t1 to t2 (period length T$2p$), and the battery 10 is charged under a condition that the battery heater 91 and the air conditioner 81 consume the power in a period 503 from t2 to tx (period length T$3p$).

Note that the period length T$2p$ and T$3p$, in which the auxiliary loads 80, 90 are actuated, can be comprehended at the initiation of the charging mode based on the actuation schedules of the auxiliary loads. Meanwhile, the period length T$1p$ of the external charging, which is not accompanied by the actuation of the auxiliary loads 80, 90, is changed by a magnitude of a total charging power amount Wt1. There is a possibility that the period 501 does not exist when the total charging power amount Wt1 is small.

As appeared in transitions of a slope of a graph in FIG. 4, the charging power of the battery 10 is changed in accordance with the consumed power by the auxiliary loads 80, 90 in the periods 501 to 503 even when the output power from the charger 42 is constant. More specifically, the actual charging power of the battery 10 in the period 502 becomes smaller than that in the period 501, and the actual charging power of the battery 10 in the period 503 further becomes smaller than that in the period 502. Average value results of the charging power (kW) in the periods 501 to 503 are respectively W$1p$/T$1p$, W$2p$/T$2p$, and W$3p$/T$3p$ by using charging power amounts W$1p$ to W$3p$ (kWh).

Accordingly, in the case where the result value of the charging power is learned with no consideration of the actuating situations of the auxiliary loads in the external charging period (ts to tx), it is concerned that an error occurs to the estimation of the required charging time period for subsequent creation of the charging schedule. For example, the actuating situations of the auxiliary loads are changed in accordance with presence or absence of the battery preheating or presence or absence of the timer air conditioning. Thus, the error possibly occurs to the estimation of the required charging time period. As a result, charging of the battery 10 is possibly uncompleted at the charging finish time tx, or charging of the battery 10 is possibly finished too early.

Accordingly, in the timer charging in the vehicle according to this embodiment, the charging power learning section 120 learns the result value of the charging power for each of the actuation patterns of the auxiliary loads exemplified in FIG. 5.

With reference to FIG. 5, actuation patterns 1, 2 of the auxiliary loads are stratified in advance in accordance with the presence or the absence of the actuation of the battery heater 91 during the external charging. Furthermore, the presence or the absence of the actuation of the air conditioner 81 is combined to the actuation patterns 1, 2, and actuation patterns 3, 4 are thereby defined.

The actuation pattern 1 corresponds to the period 501 in FIG. 4. That is, in the actuation pattern 1, a charging power learned value PLN1 is obtained based on the result value of the charging power of the battery 10 in a state where the battery heater 91 and the air conditioner 81 are turned off. In an operation example in FIG. 4, the charging power learned value PLN1 is computed by reflecting W$1p$/T$1p$.

The actuation pattern 2 corresponds to the period 502 in FIG. 4. That is, in the actuation pattern 2, a charging power learned value PLN2 is obtained based on the result value of the charging power of the battery 10 in a state where the air conditioner 81 is turned off while the battery heater 91 is turned on. In the operation example in FIG. 4, the charging power learned value PLN2 is computed by reflecting W$2p$/T$2p$.

The actuation pattern 3 corresponds to the period 503 in FIG. 4. That is, in the actuation pattern 3, a charging power learned value PLN3 is obtained based on the result value of the charging power of the battery 10 in a state where the battery heater 91 and the air conditioner 81 are turned on. In the operation example in FIG. 4, the charging power learned value PLN3 is computed by reflecting W3/T$3p$.

In the actuation pattern 4, a charging power learned value PLN4 is obtained based on the result value of the charging power of the battery 10 in a state where the air conditioner 81 is turned on while the battery heater 91 is turned off.

Each of the actuation patterns of the auxiliary loads can be stratified based on actuation/stop (on/off) of other types of equipment of the auxiliary loads 80, 90 and be segmented by further combining the actuation/stop of these. Alternatively, the actuation patterns can be stratified not only in accordance with the actuation/stop of the auxiliary loads but also in accordance with actuation/stop of the sub-DC/DC converter 76 and actuation/stop of the DC/DC converter 86 that serve as an index of the consumed power level in the auxiliary loads. Said actuation patterns can arbitrarily be defined in advance in such a manner as to be stratified based on differences in the consumed power by the auxiliary loads 80, 90.

Figure 6:
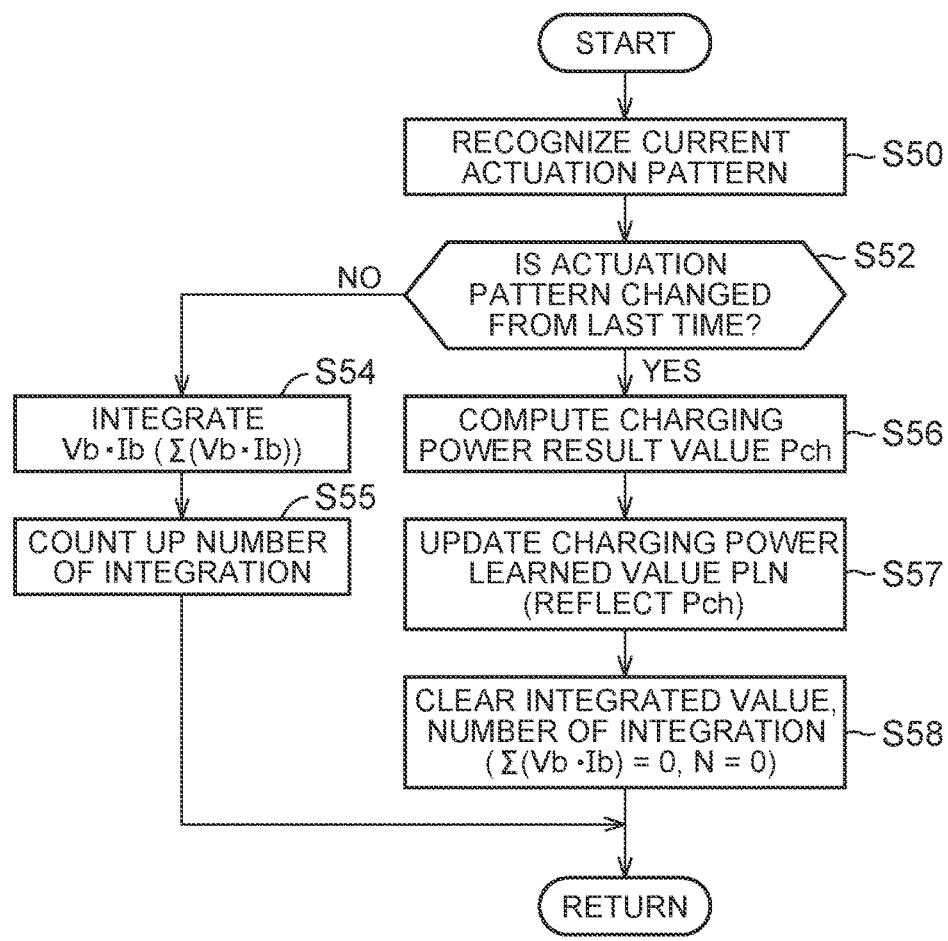
FIG. 6 is a flowchart that explains learning processing of the charging power for the timer charging in the vehicle according to this embodiment.

FIG. 6 is a flowchart for explaining learning processing of the charging power in the vehicle according to this embodiment. For example, control processing shown in FIG. 6 is periodically executed by the charging power learning section 120 (FIG. 3) during the external charging.

With reference to FIG. 6, in step S50, the charging power learning section 120 receives information from the auxiliary load control section 110 that indicates the actuating situations of the auxiliary loads 80, 90 for each interval, and thereby recognizes which of the plural predetermined actuation patterns of the auxiliary loads a current actuation pattern of the auxiliary loads is.

In step S52, the charging power learning section 120 determines whether the current actuation pattern, which is recognized in step S50, is changed from a last actuation pattern. Then, if the actuation pattern is the same as the last one (if determined NO in S52), the processing proceeds to step S54, and a product of the voltage Vb and the current Ib (that is, the charging power) of the battery 10 during the external charging is integrated. In this way, an integrated value Σ(Vb·Ib) is updated. Furthermore, in step S55, the number of integration N in the same actuation pattern is counted up. The processing in steps S54, S55 is repeatedly executed while the same actuation pattern continues.

On the other hand, if the actuation pattern is changed (if determined YES in S52), the processing proceeds to step S56, and a charging power result value Pch in the actuation pattern that has continued so far is computed. Here, Pch=Σ(Vb·Ib)/N can be computed.

Furthermore, in step S57, the charging power learning section 120 updates the charging power learned value PLN by using the charging power result value Pch in step S56. For example, the charging power learned value PLN is computed by following an equation (1) below.

$$PLN=PLN\#\cdot(1-\alpha)+\alpha\cdot Pch \quad (1)$$

In (1), PLN# is the learned value before update, and a coefficient $\alpha$ is a parameter for adjusting a learning speed and is set as $0<\alpha<1$. When $\alpha=0$, the learned value is not updated. When $\alpha=1$, the current charging power result value Pch is adopted as is for the charging power learned value PLN (PLN=Pch).

Furthermore, when learning the charging power in conjunction with a change of the actuation pattern, in step S58, the charging power learning section 120 clears both of the integrated value Σ(Vb·Ib) and the number of integration N (Σ(Vb·Ib)=0, N=0). In this way, integration processing (S54, S55) in the actuation pattern after the change is newly executed from the next time.

By the control processing in FIG. 6, the charging power learning section 120 can appropriately obtain the charging power learned values PLN1 to PLN4, . . . for each of the actuation patterns of the auxiliary loads per external charging. Note that an initial value of each of the charging power learned values can be determined in accordance with rated values of the charger 42 and the auxiliary loads 80, 90 and the like.

The charging power learned value that is obtained by the control processing in FIG. 6 is used to estimate the required charging time period in the timer charging. Here, learning of the charging power according to the control processing in FIG. 6 can be executed either during execution of the timer charging or during non-execution of the timer charging.

Figure 7:
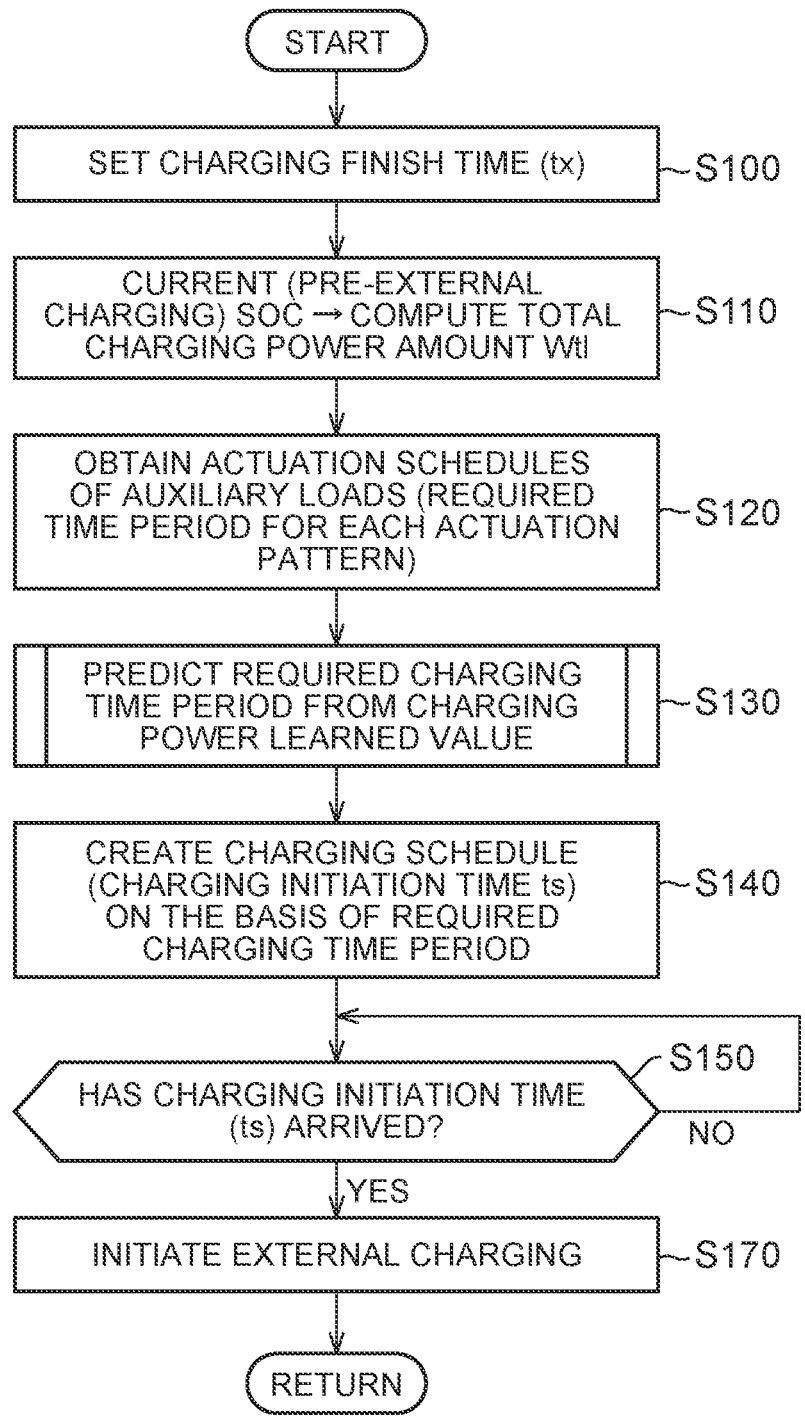
FIG. 7 is a flowchart that explains control processing for the timer charging in the vehicle according to this embodiment.

FIG. 7 is a flowchart that explains control processing for the timer charging in the vehicle according to this embodiment. The control processing according to the flowchart shown in FIG. 7 is activated when the execution of the timer charging is determined at the initiation of the charging mode.

The charging schedule creation section 130 sets the charging finish time in step S100. As described above, the charging finish time may directly be set by the user input or may be set based on the last vehicle drive initiation time. The vehicle drive initiation time may also directly be set by the user or may automatically be set by the ECU based on the past drive history and the like.

In step S110, the charging schedule creation section 130 computes the total charging power amount Wt1 based on the current SOC of the battery 10, that is, the SOC thereof prior to the external charging. Furthermore, in step S120, the charging schedule creation section 130 obtains the actuation schedules of the auxiliary loads from the auxiliary load control section 110. In this way, an operation period in each of the actuation patterns during the external charging is predicted.

Furthermore, in step S130, the charging schedule creation section 130 predicts the required charging time period in the external charging from the charging power learned value by the charging power learning section 120. Details of the processing in step S130 will be described below.

In step S140, the charging schedule creation section 130 creates the charging schedule based on the required charging time period that is estimated in step S130. In this way, the charging initiation time is determined.

Once the charging initiation time is set by the charging schedule creation section 130, it is determined in step S150 whether the charging initiation time has already arrived. Because the processing in step S150 is repeated until arrival of the charging initiation time (if determined NO in S150), the external charging is suspended even in a state where the external power supply 200 and the vehicle 100 are connected by the charging cable 55. That is, stop of the charger 42 is maintained.

On the other hand, when the charging initiation time arrives (if determined YES in S150), the external charging is initiated in step S170. In this way, the operation command is issued for the charger 42. Once the external charging is initiated, charging continues until the SOC of the battery 10 reaches the fully charged state. Because the required charging time period is computed accurately, in response to the initiation of the external charging in step S170, charging of the battery 10 to the fully charged state is completed at the charging finish time tx. The processing in steps S150, S170 can be executed by the charging ECU 47 (FIG. 1), for example.

Figure 8:
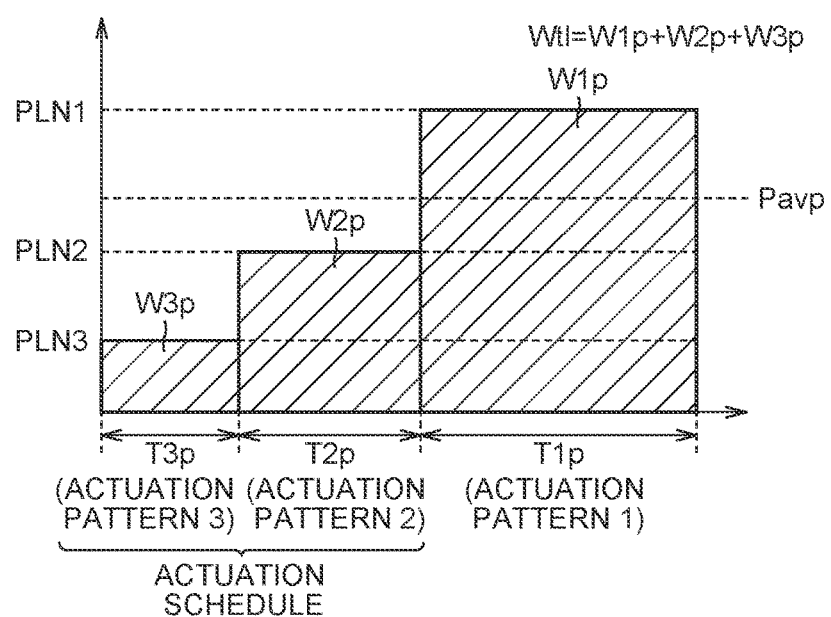
FIG. 8 is a schematic graph for explaining computation of required charging time period that corresponds to a change in the actuation pattern of the auxiliary loads.

FIG. 8 is a graph that shows a breakdown of the charging power amount with respect to a change in the actuation pattern of the auxiliary loads in the external charging. In FIG. 8, a vertical axis indicates the charging power, and a horizontal axis indicates time. FIG. 8 shows an operation example in a case where the auxiliary loads are actuated in accordance with the similar actuation schedule to that in FIG. 4.

With reference to FIG. 8, the period length T1$p$ to T3$p$ of the periods 501 to 503 shown in FIG. 4 respectively corresponds to the charging time period by the actuation patterns 1 to 3 of the auxiliary loads (FIG. 5). The period length T2$p$, T3$p$, which respectively corresponds to the charging time periods by the actuation patterns 2, 3 in which the auxiliary loads are actuated, can be computed from the actuation schedule of the auxiliary loads from the auxiliary load control section 110. Hereinafter, the period length T1$p$ to T3$p$ of the actuation patterns will also be referred to as charging time periods T1$p$ to T3$p$, respectively.

Accordingly, the charging power amounts W2$p$, W3$p$ in the periods of the actuation patterns 2, 3 can be computed by using the charging power learned values PLN2, PLN3 by the charging power learning section 120 (W2$p$=T2$p$·PLN2, W3$p$=T3$p$·PLN3).

Furthermore, the charging power amount W1$p$ in the period 501 during the external charging under such a condition that the auxiliary loads 80, 90 are not actuated is computed by subtracting the above charging power amounts W2$p$, W3$p$ from the total charging power amount Wt1, which is computed based on ΔSOC (FIG. 2). Then, the charging time period T1$p$ can be computed by dividing this charging power amount W1$p$ by the charging power learned value PLN1 from the charging power learning section 120 (T1$p$=W1$p$/PLN1). As a result, an estimated value of the required charging time period of the external charging can be computed from a sum of the charging time periods T2$p$ and T3$p$, which are defined from the actuation schedule of the auxiliary loads, and the charging time period T1$p$, which is computed by using the total charging power amount Wt1 and the charging power learned values PLN1 to PLN3.

As it is understood from FIG. 8, in the case where length of each of the charging time periods T2$p$, T3$p$ is changed due to the change of the actuation schedule of the auxiliary loads under a condition that the total charging power amount Wt1 is constant, a charging power average value Pavp is also changed. As a result, the required charging time period is also changed. That is, in the timer charging in the vehicle according to this embodiment, the estimation accuracy of the charging power average value Pavp can equivalently be improved by learning the charging power for each of the actuation patterns of the auxiliary loads. As a result, the required charging time period can be estimated at the high accuracy.

Figure 9:
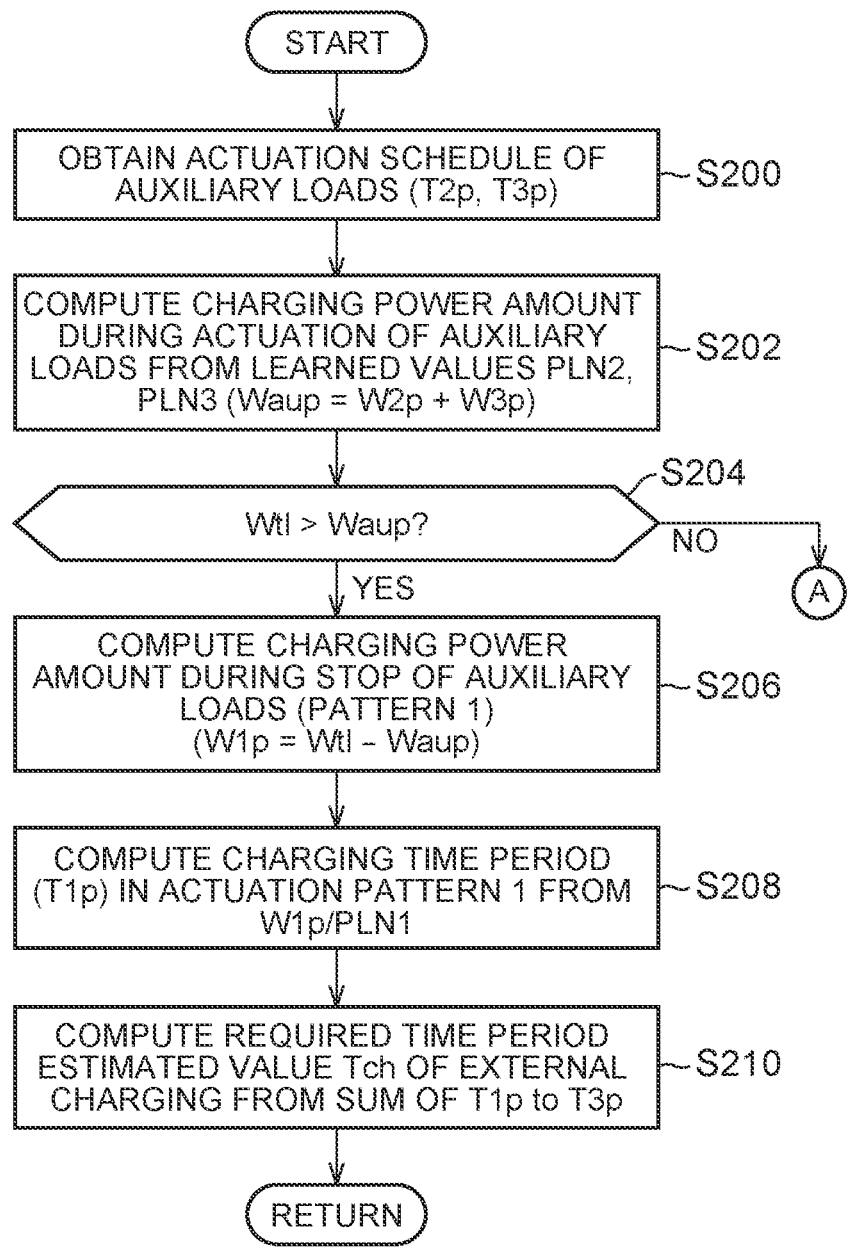
FIG. 9 is a first flowchart that provides detailed explanation on control processing for estimating the required charging time period in the timer charging in the vehicle according to this embodiment.
Figure 10:
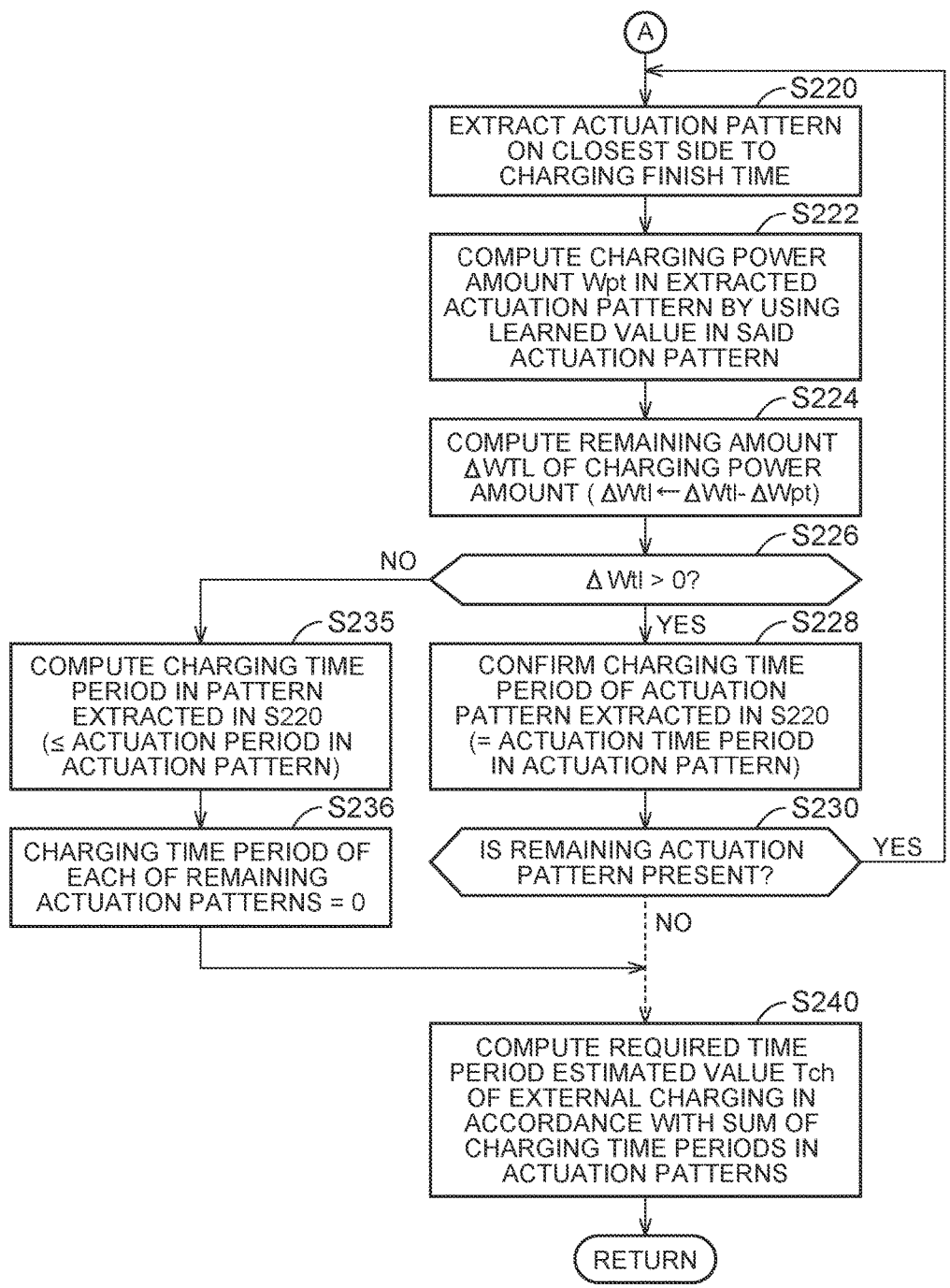
FIG. 10 is a second flowchart that provides the detailed explanation on the control processing for estimating the required charging time period in the timer charging in the vehicle according to this embodiment.

FIG. 9 and FIG. 10 show flowcharts that provide detailed explanation on control processing for estimating the required charging time period in the timer charging in the vehicle according to this embodiment. FIG. 9 and FIG. 10 correspond to the flowcharts that explain the control processing in step S130 in FIG. 7 in detail.

With reference to FIG. 9, the charging schedule creation section 130 obtains the actuation schedule of the auxiliary loads from the auxiliary load control section 110 in step S200. In this way, in the operation example of FIG. 8, the charging time periods T2$p$, T3$p$ are obtained.

Furthermore, in step S202, the charging schedule creation section 130 computes a charging power amount Waup during the actuation of the auxiliary loads. In the operation example of FIG. 8, the charging power amount Waup is computed from a sum of the charging power amounts W2$p$, W3$p$ in the actuation patterns 2, 3. As described above, the charging power amount Waup can be computed by using the charging time periods T2$p$, T3$p$, which follow the actuation schedule of the auxiliary loads, and the charging power learned values PLN2, PLN3.

As it has been described by using FIG. 8, the charging time period T1$p$, which is not associated with the actuation of the auxiliary load, is changed in accordance with a relationship between the total charging power amount Wt1 and the charging power amount Waup. For this reason, in step S204, the charging schedule creation section 130 compares the total charging power amount Wt1 and the charging power amount Waup obtained in step S202.

If Wt1>Waup (if determined YES in S204), it is understood that the charging time period T1$p$>0 in the state where the auxiliary loads are stopped. Accordingly, the processing proceeds to step S206, and the charging schedule creation section 130 estimates the charging power amount W1$p$ in the actuation pattern 1 by subtracting the charging power amount Waup during the actuation of the auxiliary loads from the total charging power amount Wt1 (W1$p$=Wt1−Waup).

Furthermore, in step S208, the charging schedule creation section 130 computes the charging time period T1$p$ in the actuation pattern 1 by dividing the charging power amount W1$p$ obtained in step S206 by the charging power learned value PLN1 from the charging power learning section 120 (T1$p$=W1$p$/PLN1). Then, the processing proceeds to step S210, and the charging schedule creation section 130 computes a required charging time period estimated value Tch of the external charging in accordance with the sum of the charging time period T1$p$ (S208) and the charging time periods T2$p$, T3$p$ (S200).

On the other hand, if Wt1≤Waup (if determined NO in S204), the charging schedule creation section 130 computes the required charging time period estimated value Tch in accordance with the control processing shown in FIG. 10.

With reference to FIG. 10, in step S220, the charging schedule creation section 130 extracts the actuation pattern that is used on the side closest to the charging finish time from the plural actuation patterns that are accompanied by the actuation of the auxiliary load shown in the actuation schedule of the auxiliary loads. For example, in the actuation patterns of the auxiliary loads shown in FIG. 4, the actuation pattern 3 of the auxiliary loads, in which both of the air conditioner 81 and the battery heater 91 are actuated, is extracted in step S220.

In step S222, the charging schedule creation section 130 computes a charging power amount Wpt in the actuation pattern that is extracted in step S220 by using the charging power learned value of said actuation pattern. For example, the charging power amount W3$p$ is computed from a product of the charging time period T3$p$ and the charging power learned value PLN3 in the actuation pattern 3.

Furthermore, in step S224, the charging schedule creation section 130 computes a remaining amount ΔWt1 of the charging power amount. The remaining amount ΔWt1 is updated by subtracting the charging power amount Wpt computed in last step S222 from a current value of ΔWt1 with the total charging power amount Wt1 being an initial value each time step S224 is executed. Next, it is determined in step S226 whether the remaining charging amount ΔWt1>0, the remaining charging amount ΔWt1 being updated in step S224.

If the remaining charging amount ΔWt1>0 (if determined YES in S226), the processing proceeds to step S228, and the charging schedule creation section 130 confirms the charging time period in the actuation pattern extracted in step S220. That is, in S228, period length of said actuation pattern that follows the actuation schedule of the auxiliary loads is set as the charging time period as is.

Furthermore, the processing proceeds to step S230, and the charging schedule creation section 130 determines whether the actuation pattern that is accompanied by the actuation of the auxiliary load remains in the plural actuation patterns shown in the actuation schedule of the auxiliary loads after the actuation pattern that is extracted in step S220 is removed.

If the pattern remains (if determined YES in S230), the processing in steps S220 to S226 is executed again. In this way, the plural actuation patterns during the external charging that are shown in the actuation schedule are extracted in an order from the actuation pattern that is on the side of the charging finish time. Furthermore, the actuation patterns are repeatedly extracted until a total of the charging power amounts by the sequentially extracted actuation patterns reach the total charging power amount Wt1.

Note that, because the processing in FIG. 10 is executed only if Wt1 Waup (if determined NO in S204), a case where all of the actuation patterns that are accompanied by the actuation of the auxiliary loads are extracted (it is determined NO in S230) in a state of ΔWt1>0 (being determined YES in S226) does not basically occur.

If ΔWt1≤0 (it is determined NO in S226), the processing proceeds to step S235, and the charging schedule creation section 130 computes the charging time period of said actuation pattern. In this case, the charging time period is computed by dividing the remaining charging amount ΔWt1 before the update (that is, a sum of ΔWt1 after the update in S224 and the charging power amount Wpt in S222) by the charging power learned value in said actuation pattern. It is understood that the charging time period computed herein is equal to the period length of said actuation pattern that follows the actuation schedule of the auxiliary loads (a case where ΔWt1=0) or shorter than the duration thereof (a case where ΔWt1<0).

Furthermore, if a non-extracted actuation pattern remains among the plural actuation patterns that are accompanied by the actuation of the auxiliary load, the charging schedule creation section 130 sets the charging time period in each of the non-extracted actuation patterns to 0 in step S236.

Moreover, the processing proceeds to step S240, and the charging schedule creation section 130 computes the required charging time period estimated value Tch of the external charging in accordance with a sum of the charging time periods in the actuation patterns that are accompanied by the actuation of the auxiliary load and that are computed or set in steps S228, S235, or S236.

In this way, in both of a case where the external charging of the battery 10 is completed only by the external charging that is accompanied by the actuation of the auxiliary loads (FIG. 10) and a case where the charging time period that is not accompanied by the actuation of the auxiliary loads exists (FIG. 9), the required time period of the external charging can accurately be computed in accordance with the actuation pattern of the auxiliary load.

Figure 11:
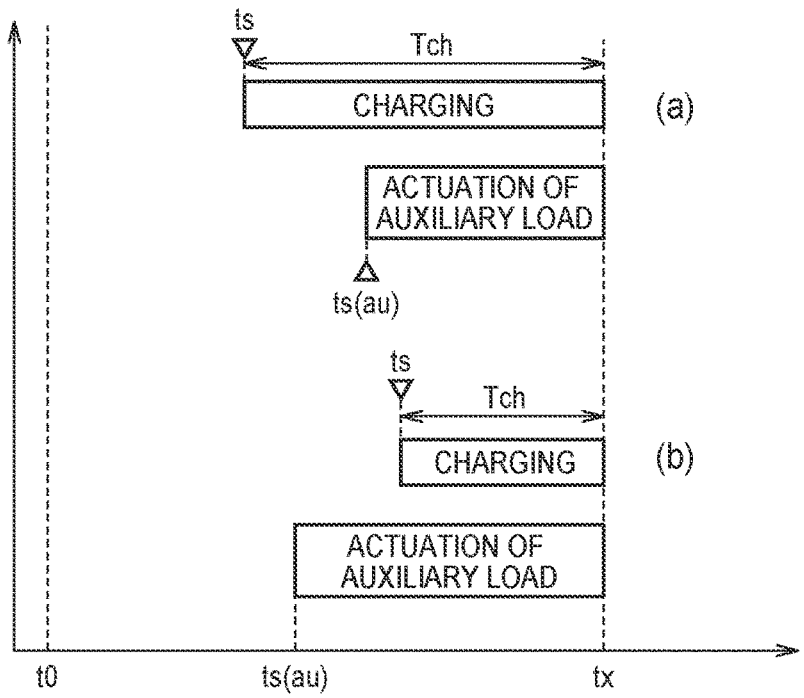
FIG. 11 is a schematic graph that explains creation examples of a charging schedule based on estimation of the required charging time period of the external charging.

FIG. 11 is a schematic graph that explains creation examples of the charging schedule based on the estimation of the required charging time period of the external charging.

(a) in FIG. 11 shows a creation example at a time when the required charging time period is estimated in accordance with the control processing in FIG. 9, and (b) in FIG. 11 shows a creation example at a time when the required charging time period is estimated in accordance with the control processing in FIG. 10.

With reference to FIG. 11, at the time t0, a state where the external charging can be initiated due to connection of the charging cable 55 is generated, and the charging mode is initiated. The charging schedule is created such that the battery 10 becomes the fully charged state at the charging finish time tx.

In a case of (a) in FIG. 11, the charging initiation time ts is set in accordance with the required charging time period estimated value Tch that is computed in step S210 in FIG. 9. Meanwhile, the auxiliary load 80 or 90 starts being actuated from actuation initiation time ts(au) in accordance with the actuation schedule by the auxiliary load control section 110. For example, the battery heater 91 is turned on from this timing for the battery preheating.

In (a) in FIG. 11, because Wau<Wt1 (it is determined YES in S204), the battery 10 does not reach the fully charged state only with the charging power amount by the external charging in the actuation period of the auxiliary load. Thus, it is understood that the charging initiation time ts comes earlier than the actuation initiation time ts(au).

Meanwhile, in a case of (b) in FIG. 11, charging initiation time ts is set in accordance with the required charging time period estimated value Tch that is computed in step S240 in FIG. 10. Meanwhile, the auxiliary load 80 or 90 starts being actuated from actuation initiation time ts(au) in accordance with the actuation schedule by the auxiliary load control section 110. In (b) in FIG. 11, because Wau≥Wt1 (it is determined NO in S204), the battery 10 becomes the fully charged state only with the charging power amount by the external charging in the actuation period of the auxiliary load. Thus, the actuation initiation time ts(ch) comes earlier than the charging initiation time ts.

As it has been described so far, according to the vehicle according to this embodiment, the result value of the charging power during the external charging can be learned for each of the actuation patterns of the auxiliary loads. Accordingly, even in the case where the charging power of the battery 10 is changed in accordance with the actuating situation of the auxiliary load, the required charging time period can accurately be estimated by using the learned value of the charging power.

As a result, the charging initiation time can appropriately be set such that the battery 10 becomes the fully charged state at the set charging finish time in the external charging by the timer charging. In this way, a case where the external charging of the battery 10 is uncompleted at the drive initiation time of the vehicle 100 or a case where the battery 10 is left in the fully charged state for a long time period does not occur. Therefore, improvement in convenience of the user and deterioration prevention of the battery can be realized.

Figure 12:
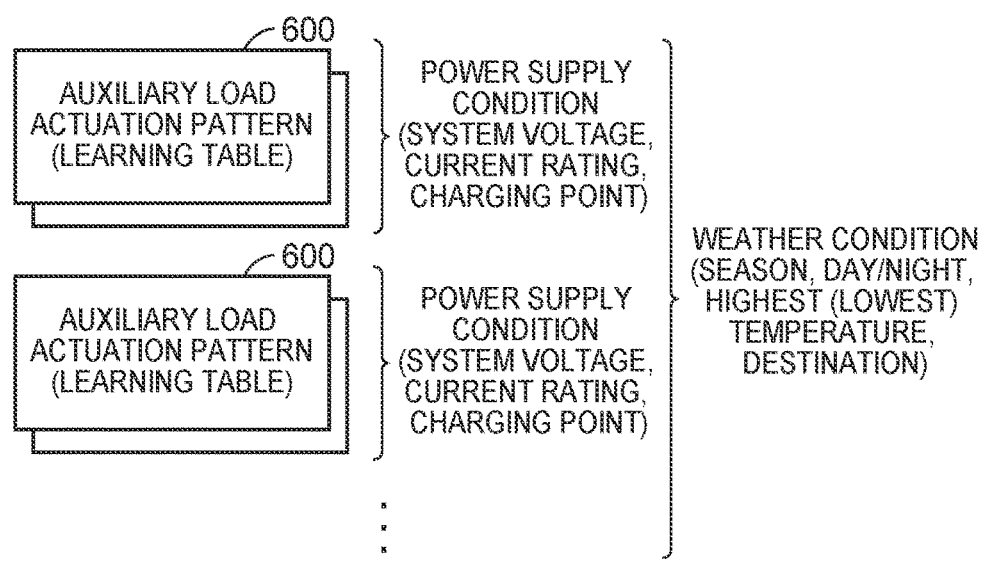
FIG. 12 is a conceptual diagram that explains a modified example of learning table setting in charging power learning.

(Modified Example of Charging Power Learning) FIG. 12 is a conceptual chart that explains a modified example of learning table setting in charging power learning by the charging power learning section 120.

With reference to FIG. 12, a learning table 600 is designed such that the charging power learned value is obtained for each of the actuation patterns that are defined in advance to be able to appropriately section the actuating situations of the auxiliary loads 80, 90 in light of the consumed power. As described above, the actuation pattern of the auxiliary load is defined in accordance with on/off of the particular auxiliary load (the battery heater 91 and/or the air conditioner 81) or the actuation states of the sub-DC/DC converter 76 and the DC/DC converter 86 for providing auxiliary power supplies.

The learning table 600 can also independently be provided for each power supply condition that indicates a condition of the external power supply 200. As the power supply condition, a system voltage (100 V/200 V) of the external power supply 200 and current rating (normal charging/rapid charging) or a charging point (home/office/parking, or the like) can be adopted.

By separating the learned value for each of the power supply conditions, a difference in the charging power due to an inherent difference between the charging facilities can be absorbed by the charging power learned value even in the case where the external charging of the vehicle 100 is conducted by using a different charging facility. Therefore, the accuracy in the estimation of the required time period for the external charging can further be increased.

Alternatively, instead of the power supply condition, or further by combining with the power supply condition, the learning table 600 can independently be provided for each weather condition. As the weather condition, seasons and day/night that are stratified by date/time information, an atmospheric temperature (a highest temperature or a lowest temperature) outside the vehicle, or a destination of the vehicle 100 (a cold area, a tropical area, or the like) can be adopted.

By separating the learned value for each of the weather conditions, the charging power can be learned while a difference in charging efficiency in accordance with the temperature of the battery 10 is reflected. In addition, the charging power can be learned by distinguishing warming and cooling in the timer air conditioning by the air conditioner 81.

In this way, accuracy of learning of the result value of the charging power can further be increased by independently providing the learning table 600 for each of the power supply condition and/or the weather condition.

Alternatively, in order to increase the accuracy of the charging power learning, it is also possible to prohibit the charging power learning during actuation of a specified auxiliary load (a particular load).

Figure 13:
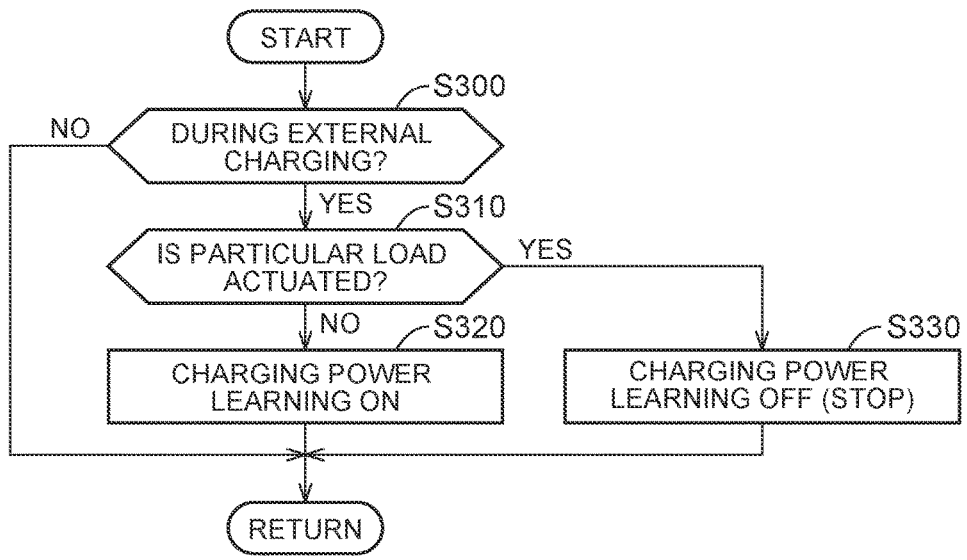
FIG. 13 is a flowchart that explains on/off control of the charging power learning.

FIG. 13 shows a flowchart for controlling execution (on) and stop (off) of the charging power learning. Control processing in accordance with the flowchart in FIG. 13 can be executed by the charging power learning section 120 (FIG. 3), for example.

With reference to FIG. 13, in step S310, the charging power learning section 120 determines whether the particular load is actuated during the external charging (if determined YES in S300).

The particular load in S310 can be defined in advance to include equipment with large consumed power (for example, the head light) or equipment with a tendency of unstable consumed power (for example, audio equipment with the sound volume adjusting function). Note that on/off of said particular load is not reflected to the definition of the actuation pattern in the learning table 600.

If the particular load is stopped (if determined NO in S310), the processing proceeds to step S320, and the charging power learning section 120 executes learning of the result value of the charging power by following FIG. 6.

On the other hand, if the particular load is actuated (if determined YES in S310), the processing proceeds to step S330, and the charging power learning section 120 stops learning of the charging power. In this way, it is possible to prevent the charging power at a time when the consumed power by the auxiliary load is large and the charging power at a time when the consumed power fluctuates from being reflected to the learned value. Thus, it is possible to prevent the charging power learned value from fluctuating and increase the learning accuracy.

Note that the configuration of the vehicle 100 according to this embodiment is illustrative. For a purpose of confirmation, a point that the present disclosure can be applied to a vehicle with a timer charging function without limiting configurations of a drive system and an external charging system is described.

In particular, the configuration in which the external charging is executed by establishment of electrical connection through the charging cable 55 is exemplified in FIG. 1. However, the timer charging according to this embodiment can also commonly be applied to an aspect that is not accompanied by the electrical connection, for example, a vehicle in which the external charging is executed by contactless transmission of the AC power at a specified frequency between a power transmission coil and a power receiving coil.

Here, this embodiment will be summarized. During the external charging of the battery 10 with the power of the external power supply 200, the actuation patterns of the auxiliary loads 80, 90 are stratified, and the result value of the charging power of the battery 10 is learned for each of the actuation patterns. When the schedule of the timer charging is created, the required charging time is estimated based on: the execution time period of each of the actuation patterns in accordance with the actuation schedules of the auxiliary loads 80, 90 that are controlled on the time basis during the external charging; the charging power leaned value in each of the actuation patterns; and the total charging power amount to the fully charged state that is obtained from the SOC prior to the external charging. In accordance with the estimated required charging time period, the initiation time of the external charging is set by computing backward from the charging finish time of the timer charging.

It should be considered that the embodiment disclosed this time is illustrative in any respect and thus is not restrictive. The scope of the present disclosure is not indicated by the above description but by the claims, and intends to include all changes in the equivalent meaning to the claims and within the claims.

What is claimed is:

1. A vehicle comprising:
an electrical storage device;
an auxiliary load including plural loads from different devices configured to be actuated by consuming electric power;
a charger configured to charge the electrical storage device with power supplied from a power supply outside the vehicle; and
an electronic control unit configured to:
create an actuation schedule prior to initiation of charging, the actuation schedule designating time at which the auxiliary load is actuated during the charging of the electrical storage device;
stratify actuation patterns based on both the presence and the absence of the actuation of the plural loads of the auxiliary load and learn charging power of the electrical storage device for each of the actuation patterns during the charging;
estimate a required time period for the charging based on a learned value of the charging power for each of the actuation patterns, an execution time period of each of the actuation patterns in accordance with the actuation schedule, a total charging power amount obtained from a state of charge of the electrical storage device, and the state of charge being a state of charge at a time before the initiation of the charging; and
set initiation time of the charging in accordance with an estimated required time period.

2. The vehicle according to claim 1, wherein
the auxiliary load includes a heater configured to be actuated so as to raise a temperature of the electrical storage device when being actuated,
the electronic control unit is configured to create the actuation schedule such that the heater is actuated during the charging, and
the actuation patterns are separated from each other in accordance with stop and actuation of the heater.

3. The vehicle according to claim 1, wherein
the auxiliary load includes:
an air conditioner configured to be actuated so as to adjust a temperature inside a vehicle cabin; and
a heater configured to be actuated to raise a temperature of the electrical storage device,
the electronic control unit is configured to create the actuation schedule such that the air conditioner and the heater are actuated during the charging, and
the actuation patterns are separated from each other in accordance with presence or absence of actuation of the heater and presence or absence of actuation of the air conditioner.

4. The vehicle according to claim 1 further comprising:
a first power converter configured to convert power from the charger into drive power of the auxiliary load; and
a second power converter configured to convert power from the electrical storage device into the drive power of the auxiliary load, a power capacity of the second power converter being larger than a power capacity of the first power converter, wherein
the electronic control unit is configured to actuate at least one of the first power converter and the second power converter in accordance with an actuating situation of the auxiliary load during the charging, and
the actuation patterns are separated from each other during actuation of the first power converter and during actuation of the second power converter.

5. The vehicle according to claim 1, wherein
the electronic control unit is configured to learn a charging power learned value in each of the actuation patterns separately for each condition of the power supply outside the vehicle.

6. The vehicle according to claim 1, wherein
the electronic control unit is configured to learn a charging power learned value in each of the actuation patterns separately for each weather condition during the charging.

7. The vehicle according to claim 1, wherein
the electronic control unit is configured to stop learning of the charging power during actuation of a particular load among the auxiliary loads.

* * * * *

UNITED STATES PATENT AND TRADEMARK OFFICE
CERTIFICATE OF CORRECTION

PATENT NO. : 9,937,817 B2
APPLICATION NO. : 15/162170
DATED : April 10, 2018
INVENTOR(S) : Yamato Niwa et al.

Page 1 of 1

It is certified that error appears in the above-identified patent and that said Letters Patent is hereby corrected as shown below:

In the Specification

Column 10, Line 61, after "external charging between the time" delete "is" and insert --ts--, therefor.

Signed and Sealed this
Third Day of July, 2018

Andrei Iancu
*Director of the United States Patent and Trademark Office*